United States Patent [19]

Borgerson et al.

[11] 4,099,248
[45] Jul. 4, 1978

[54] ONE'S COMPLEMENT SUBTRACTIVE ARITHMETIC UNIT UTILIZING TWO'S COMPLEMENT ARITHMETIC CIRCUITS

[75] Inventors: Barry R. Borgerson, Gwynedd Valley; Garold S. Tjaden, Doylestown, both of Pa.

[73] Assignee: Sperry Rand Corporation, New York, N.Y.

[21] Appl. No.: 763,745

[22] Filed: Jan. 28, 1977

[51] Int. Cl.² .............................................. G06F 7/50
[52] U.S. Cl. ................................................... 364/787
[58] Field of Search ........................ 235/175; 364/787

[56] References Cited
U.S. PATENT DOCUMENTS

| 3,700,875 | 10/1972 | Saenger et al. | 235/175 |
| 3,805,045 | 4/1974 | Larsen | 235/175 |
| 3,863,061 | 1/1975 | Kazantzis et al. | 235/175 |
| 3,970,833 | 7/1976 | Gehweiler et al. | 235/175 |

Primary Examiner—David H. Malzahn
Attorney, Agent, or Firm—Howard P. Terry; Albert B. Cooper

[57] ABSTRACT

The one's complement subtractive arithmetic unit comprises a parallel adder with a connection for providing an end-around carry, from the carry output of the most significant stage to the carry input of the least significant stage. The parallel adder is implemented utilizing multiple bit LSI ALU chips or microprocessor slices that provide group propagate and generate indication signals. Carry look-ahead chips responsive to the group propagate and generate indication signals provide a fast carry arrangement for the arithmetic unit. Circuitry is included to detect when all of the carry propagate indicators are on for providing a signal to the carry input of the parallel adder resulting in the equivalent performance of a one's complement subtractive arithmetic unit.

8 Claims, 4 Drawing Figures

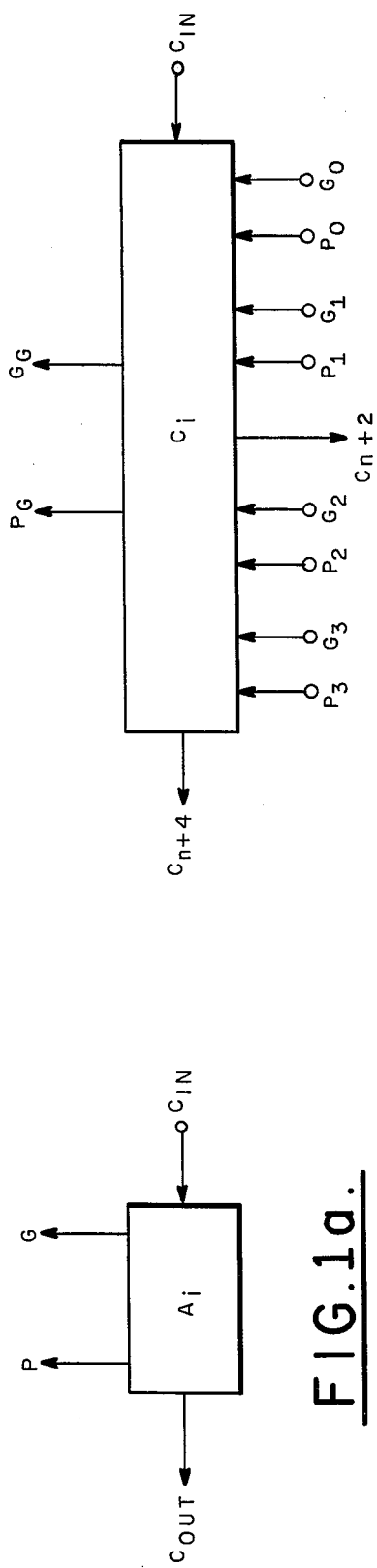
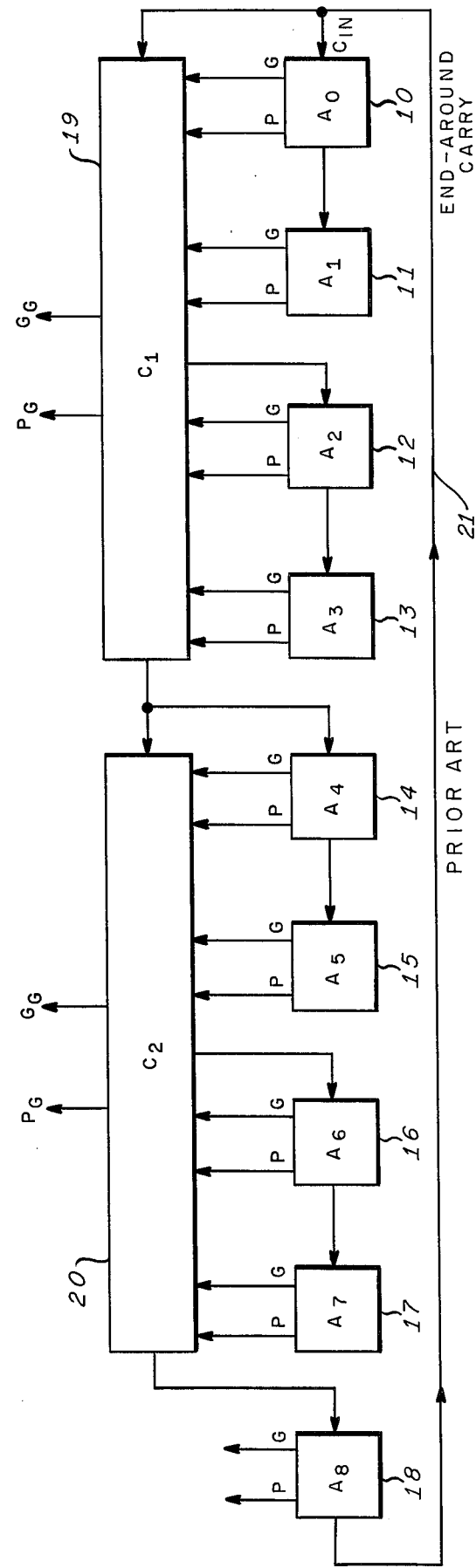
FIG. 1a.
FIG. 1b.
FIG. 2. PRIOR ART

ONE'S COMPLEMENT SUBTRACTIVE ARITHMETIC UNIT UTILIZING TWO'S COMPLEMENT ARITHMETIC CIRCUITS

BACKGROUND OF THE INVENTION

1. Field of the Invention

The invention relates to binary arithmetic units particularly of the one's complement subtractive variety.

2. Description of the Prior Art

One's complement subtractive addition and subtraction is a commonly utilized arithmetic arrangement in present day general purpose digital computers. For example, the SPERRY UNIVAC 1100 Series computers utilize one's complement subtractive arithmetic units, (SPERRY UNIVAC is a registered trademark of the SPERRY RAND CORPORATION). The one's complement binary number representation has the property that the designation of $+$zero ($+0$) and $-$zero ($-0$) are different where:

$$+0 = (000\ldots0)_2$$

$$-0 = (111\ldots1)_2$$

In the SPERRY UNIVAC 1100 Series processors, the arithmetic operations of addition and subtraction are performed with one's complement subtractive adders. Such a device utilizes a Boolean subtracter wherein addition is performed by forming the one's complement of one of the operands and subtracting it from the other. Subtraction is performed by subtracting without forming the complement of the number. The one's complement subtractive adder has the property that the value of ($-0$) can be generated in only two ways:

$$(-0) + (-0) = -0$$

$$(-0) - (+0) = -0$$

One's complement addition and subtraction can also be performed utilizing a Boolean adder. Subtraction is performed by forming the one's complement of one of the operand inputs and adding it to the other. Addition is performed by adding the two operands without forming the complement. With this adder arrangement ($-0$) is produced only when a number is subtracted from itself or a number and its complement is added as follows:

$$(+x) - (+x) = -0$$

$$(+x) + (-x) = -0$$

A problem arises in implementing a computer having a one's complement subtractive arithmetic unit utilizing commercially procurable LSI components such as ALU chips and microprocessor slices, such LSI components being normally designed utilizing two's complement adders. A two's complement adder is a Boolean adder circuit that performs addition and subtraction by utilizing the two's complement binary number representation. A two's complement adder may be utilized as a one's complement adder by providing an end-around carry from the most significant to the least significant stage. Heretofore, however, it has not been possible to utilize such two's complement adders to perform in the manner of a one's complement subtractive adder.

SUMMARY OF THE INVENTION

A one's complement subtractive adder for performing addition and subtraction is implemented from a two's complement adder by providing an end-around carry signal and by utilizing logic coupled to the adder for providing a signal to the carry input to the least significant stage thereof whenever the numbers being combined by the adder are one's complements of each other.

BRIEF DESCRIPTION OF THE DRAWINGS

FIG. 1A is a symbolic illustration of an LSI ALU chip or microprocessor slice utilized in implementing the adder of the present invention, FIG. 1B is a symbolic illustration of an LSI lookahead carry chip utilized in the present invention, FIG. 2 is a schematic block diagram of a conventional one's complement adder/subtracter utilizing two's complement LSI components.

DESCRIPTION OF THE PREFERRED EMBODIMENTS

Figure 3:
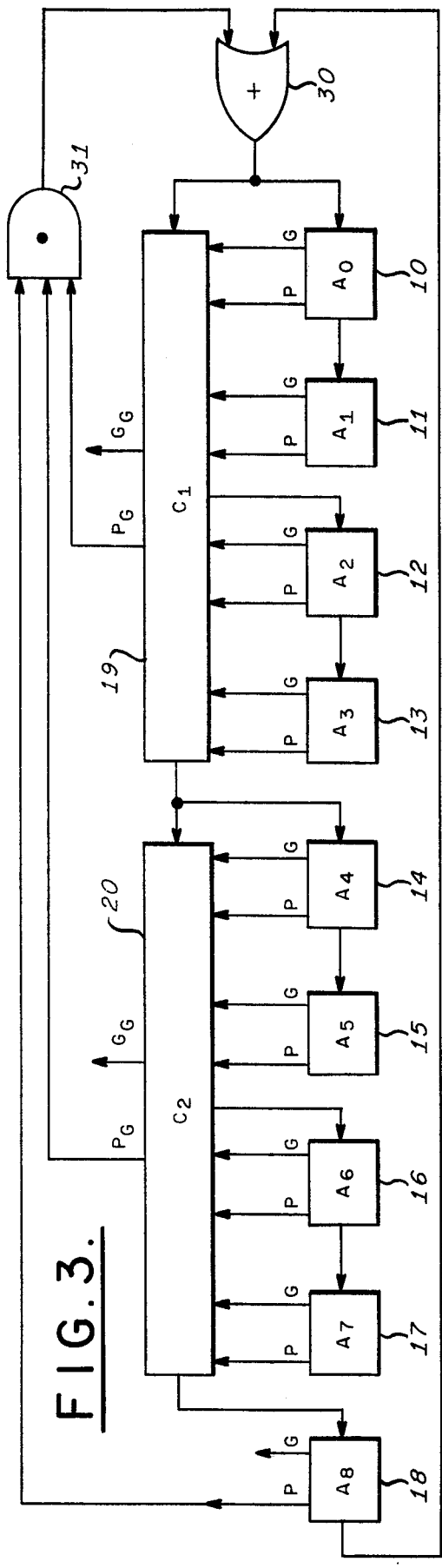
FIG. 3 is a schematic block diagram of one embodiment of one's complement subtractive adder/subtracter implemented in accordance with the invention from two's complement LSI components.

The present invention has been implemented with respect to emulating the one's complement subtractive adder of the SPERRY UNIVAC 1100 Series processors, which operates upon 36 bit binary numbers. The emulation is performed utilizing two's complement LSI components. The invention may be embodied utilizing, for example, 4 bit ALU's or 4 bit microprocessor slices, 9 such slices being required for implementing the 36 bit parallel adder. A 4 bit ALU chip such as the commercially procurable Motorola MC10181 or the 4 bit microprocessor slice, Motorola M10800, may be utilized. The adder/subtracter of the present invention is also implemented utilizing commercially procurable look-ahead carry chips such as the Motorola MC10179. The components MC10181 and MC10179 are fully described in "The Semiconductor Data Library", Series A, Volume 4, 1974, available from Motorola Semiconductor Products, Inc. The M10800 component is fully described in "The M10800-High Performance MECL LSI Processor Family", 1976 which is also available from Motorola Semiconductor Products, Inc.

Referring to FIG. 1A, a symbol for a 4 bit ALU chip or 4 bit microprocessor slice is illustrated where $C_{in}$ is the carry in lead, $C_{out}$ is the carry out lead, P is the carry propagate lead and G is the carry generate lead as described in said Motorola publications. It will be appreciated that the chip or slice $A_i$, as illustrated, includes 4 parallel inputs for the 4 bits of one operand and 4 additional parallel inputs for the 4 bit second operand as well as a 4 bit parallel output for the sum or difference of the two input operands as described in said Motorola publications. The chip or slice $A_i$ includes a 4 bit parallel adder for combining the input operands, the $C_{in}$ lead providing the carry in to the least significant stage of the 4 bit adder and the $C_{out}$ lead providing the carry out from the most significant stage thereof.

The chip or slice $A_i$ processes bits $2^i$, $2^{i+1}$, $2^{i+2}$ and $2^{i+3}$ of the 36 bit operands of the emulated arithmetic unit. The four input bits to the chips or slice $A_i$ of one operand may be designated as $X_0$, $X_1$, $X_2$ and $X_3$ and the four input bits of the other operand as $Y_0$, $Y_1$, $Y_2$ and $Y_3$. Thus, for any bit $w$, $P_w$ is the propagate condition for that bit and $G_w$ is the generate condition. This may be expressed in Boolean equation form as: $P_w = X_w + Y_w$ and $G_w = X_w \cdot Y_w$. Thus, the propagate and generate signals for the chip may be expressed as:

$$P = P_0 P_1 P_2 P_3$$

$$G = G_3 + P_3 G_2 + P_3 P_2 G_1 + P_3 P_2 P_1 G_0$$

It will be appreciated that the operand inputs and result outputs are not shown in FIG. 1A for simplicity. It is further appreciated, in accordance with conventional notation for these chips, that if $C_{in}$ is designated as $C_n$, then $C_{out}$ is $C_{n+4}$.

Referring now to FIG. 1B, a symbolic representation of the above-referenced look-ahead carry chip is illustrated. The look-ahead carry chip has inputs for the generate and propagate leads (G and P) from four of the chips or slices illustrated in FIG. 1A, these inputs being designated as $G_0$, $P_0$, $G_1$, $P_1$, $G_2$, $P_2$ and $G_3$, $P_3$. The chip also has a carry input $C_{in}$. The look-ahead carry chip provides a group propagate indicator $P_G$ and a group generate indicator $G_G$ for inputs to the chip as well as two carry out indicators $C_{n+2}$ and $C_{n+4}$. The chip provides the group propagate and group generate indicators $P_G$ and $G_G$, respectively, for the inputs to the chip as follows:

$$G_G = G_3 + G_2 P_3 + G_1 P_2 P_3 + G_0 P_1 P_2 P_3$$

$$P_G = P_0 P_1 P_2 P_3$$

The $C_{n+2}$ carry out indicator generates a carry out signal based on the carry in, $C_{in}$, and the propagate and generate signals from the two least significant ALU chips or microprocessor slices as follows:

$$C_{n+2} = C_{in} P_0 P_1 + G_0 P_1 + G_1$$

The $C_{n+4}$ carry out indicator is based on $C_{in}$ and the generate and propagate leads from all four of the input ALU chips or microprocessor slices as follows:

$$C_{n+4} = C_{in} P_0 P_1 P_2 P_3 + G_3 + G_2 P_3 + G_1 P_2 P_3 + G_0 P_1 P_2 P_3 = C_{in} P_G + G_G$$

Referring now to FIG. 2, a 36 bit conventional one's complement adder is illustrated comprising 9 ALU chips or microprocessor slices 10-18 of the type discussed above with respect to FIG. 1A. The adder also includes two look-ahead carry chips 19 and 20 of the type described with respect to FIG. 1B. The interconnections amongst the components 10-20 comprises a conventional fast carry arrangement of the type illustrated and discussed in said Motorola Data Library publication. Since the ALU's 10-18 are internally configured to perform two's complement addition, the adder of FIG. 2 is converted to a one's complement adder by the inclusion of an end-around carry from the carry output of the most significant chip 18 to the carry input of the least significant chip 10 via a lead 21. The use of the end-around carry via the lead 21 to provide a one's complement adder is well understood and will not be further described herein for brevity.

It will be appreciated that the one's complement adder of FIG. 2 cannot be utilized to perform the one's complement subtractive addition of the SPERRY UNIVAC 1100 Series computers because the value (−0) can be generated, as discussed above, for combinations of operands which would not produce (−0) in the SPERRY UNIVAC 1100 processors.

Referring now to FIG. 3, in which like reference numerals indicate like components with respect to FIG. 2, a one's complement subtractive adder implemented in accordance with the invention is illustrated. The components 10-20 are identical to and are interconnected in the same manner as the similarly designated components of FIG. 2. The end-around carry signal on the lead 21 is, however, applied through an OR gate 30 for application to the carry inputs of the components 10 and 19.

In accordance with the invention, an additional compensating carry is required for reasons to be discussed and in the embodiment of FIG. 3 is provided through the OR gate 30 via an AND gate 31 where the three inputs thereof are derived from the propagate output from the ALU chip or microprocessor slice 18 and the group propagate indicators $P_G$ of the look-ahead carry chips 19 and 20. The AND gate 31 connected as illustrated provides the necessary compensating carry signal to generate results identical to those produced by the SPERRY UNIVAC 1100 series subtractive adders. This arrangement is predicated on the fact that an unwanted negative zero that would otherwise have been generated is produced if and only if the carry propagate signals P of all of the ALU's 10-18 are on. This situation occurs, as described above, only when the adder is utilized to subtract a number from itself by taking the one's complement of one of the operand inputs and thereafter adding or when any number is added to its one's complement. The result is the unwanted all one's negative zero representation. When all of the propagate signals from the ALU's 10-18 are on, the group propagate indicators $P_G$ of the look-ahead carry chips 19 and 20 are also on thus turning on the AND gate 31. The enabled output of the AND gate 31 provides an end-around carry through the OR gate 30 which when added to the all one's result, changes this negative zero representation to the desired positive zero representation of all zero's.

It is appreciated that the compensating carry signal from the AND gate 31 is only provided under the conditions specified. Under all other conditions the end-around carry provided by the lead 21 produces results equivalent to the one's complement subtractive addition of the SPERRY UNIVAC 1100 series computers. The connections illustrated provide the desired negative zero result when endeavoring to add two negative zero's and when endeavoring to subtract a negative zero and a positive zero as discussed above. For all other combinations of the operations of addition and subtraction and the negative and positive zero operands the desired positive zero result is provided.

It will be appreciated that each of the ALU's 10-18 is a complete arithmetic and logic unit that includes a complementor between the chip input and the basic adder circuitry. As described above, the chip utilizes the complementor when performing subtraction. Thus, it is appreciated from the foregoing that the unwanted negative zero condition for which the compensating carry signal is generated, only occurs when the two input numbers to the basic adder circuitry are ONE's complements of each other.

As an example of the operation of the adder of FIG. 3 utilizing 4 bit binary numbers let one operand $x = 11_{10} = 1011_2$ with the other operand as $-x = 0100_2$ in one's complement form.

$$(x) = +(11)_{10} = 1011_2$$
$$-(x) = -(11)_{10} + 0100_2$$
$$\overline{O_{10} = 1111_2} = -O$$

Each bit position of the above summation will propagate a carry should a carry be provided from its low-order adjacent bit. As described above, the logical equation for the carry propagate for a bit position $w$ and two operands $$x = x_3x_2x_1x_0 \text{ and } Y = Y_3Y_2Y_1Y_0 \text{ is } P = x_w\overline{Y_w} + \overline{x_w}Y_w$$

If each bit position of an ALU or microprocessor slice statisfies the carry propagate equation then the carry propagate signal of the ALU or microprocessor slice will be turned on. If a single bit position will not propagate a carry then the value in that bit position resulting from addition of those bits must be zero because the only two possible one bit numbers which can be added and not satisfy the carry propagate equation are

```
     0          1
    +0         +1
     0   1 ←    0
        carry out
```

It is appreciated that to surpress the undesired negative zero result in the given example in order to provide the equivalent of the one's complement subtractive adder, the AND gate 31 provides a compensating carry into the least significant bit of the adder only when the carry propagate signals of all of the ALU's 10–18 are on. As explained, this condition is detected by examining the propagate outputs of the look-ahead carry chips 19 and 20 along with the propagate signal from the ALU 18. The compensating carry generated to correct for the undesired negative zero effectively adds one to the all one's value, producing the desired all zero's value of +0.

It will be appreciated that when utilizing ECL logic in implementing the apparatus of FIG. 3 a wired-or arrangement may be utilized to combine the carrys on the line 21 with the carrys from the AND gate 31, thereby eliminating the OR gate 30.

Figure 4:
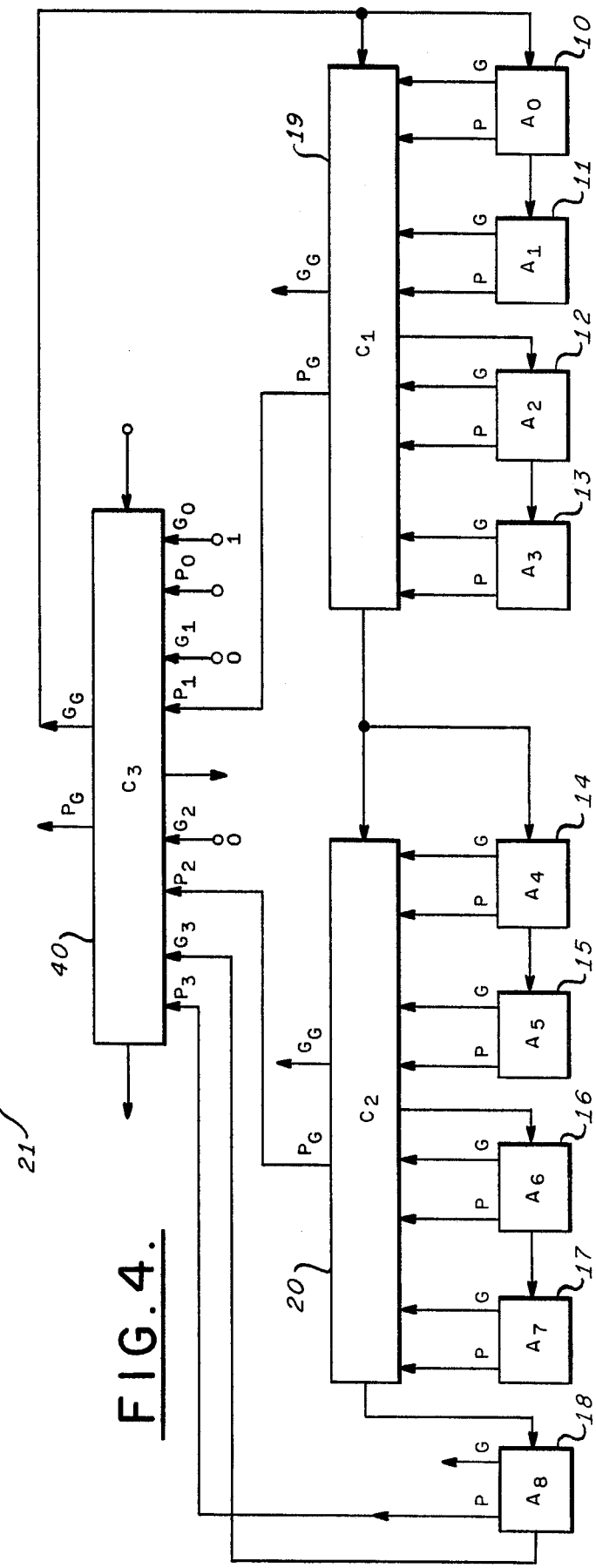
FIG. 4 is a schematic block diagram of an alternative embodiment of a one's complement subtractive adder/subtracter implemented in accordance with the invention from two's complement LSI components.

Referring now to FIG. 4 in which like reference numerals indicate like components with respect to FIGS. 2 and 3, an alternative embodiment of the invention is illustrated. The components 10–20 are identical to and are interconnected in the same manner as the similarly designated components of FIGS. 2 and 3. The end-around carry provided on the lead 21 and the compensating carry provided by the AND gate 31 are produced by an additional look-ahead carry circuit 40 connected as illustrated with logical one and logical zero signals being provided to the appropriate leads as indicated by the legends. The input leads to the chip 40 without any designated input legends are left unconnected.

The group generate lead $G_G$ from the look-ahead carry chip 40 is connected to the carry inputs of the components 10 and 19 to provide the end-around carry signal and the compensating carry signal described with respect to FIG. 3. As explained above, the group generate indicator $G_G$ is provided as follows:

$$G_G = G_3 + G_2P_3 + G_1P_2P_3 + G_0P_1P_2P_3$$

Because of the binary one applied to the $G_0$ input to the chip 40 and the binary zero's applied to the $G_1$ and $G_2$ inputs thereof the $G_G$ equation reduces to:

$$G_G = G_3 + P_1P_2P_3$$

It will therefore be appreciated that the term $P_1P_2P_3$ provides the equivalent output of the AND gate 31 of FIG. 3 while the term $G_3$ provides the end-around carry signal equivalent to that provided by the lead 21 of FIG. 3.

Thus, it can be appreciated from the foregoing that the suppression of the undesired all one's result depends on the fact that the only way in which the all one's result can be produced is by adding two operands which are the logical complement of each other. It is further appreciated that it is under this complement situation that a carry will be propagated by the adder circuitry and that present day ALU's produce an indication of this propagate situation for use by look-ahead carry circuits. Thus, the undesired all one's data result can be changed to the desired all zero's result by producing a carry-in through the arithmetic unit whenever the propagate indicator for a complete data word is on. This carry-in adds one to the all one's data word producing the desired all zero's data word.

It will be appreciated that, although the above described embodiments of the invention were explained in terms of the Motorola LSI components MC10800 or MC10181, along with the look-ahead carry chips MC10179, numerous other similarly configured LSI ALU chips and microprocessor slices as well as carry look-ahead chips are commercially procurable and suitable for implementing the described embodiments. It is furthermore appreciated that MSI components as well as discreetly wired adders and fast carry circuits may also be utilized.

It will also be appreciated that although, the invention was described in terms of utilizing a Boolean adder to simulate a subtractive circuit, the invention may also be utilized in the converse situation.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Apparatus for performing one's complement addition and subtraction comprising
    parallel multiple stage arithmetic means for linearly combining two binary number representations expressed in true and one's complement form, said arithmetic means including a least and a most significant stage, said most significant stage having a carry output and said least significant stage having a carry input, said arithmetic means including carry propagate outputs associated with said stages, correction means coupled to said carry output for providing an end-around carry signal from said carry output to said carry input, and compensation means responsive to said carry propagate outputs for providing a compensation signal to said carry intput whenever all of said carry propagate outputs are energized, said compensation means including look-ahead carry means responsive to said carry propagate outputs for providing at least one group propagate output, thereby providing said compensation signal to said carry input.

2. The apparatus of claim 1 in which said compensation means and said correction means includes OR gate means responsive to said end-around carry signal and said compensation signal for providing said signals to said carry input.

3. The apparatus of claim 1 in which said arithmetic means comprises a multiple stage parallel binary adder.

4. The apparatus of claim 3 in which said look-ahead carry means comprises means responsive to said carry propagate outputs for providing group propagate outputs, said compensation means and said correction means including further look-ahead carry means responsive to said group propagate outputs and to said carry output of said most significant stage for providing a group generate output to said carry input in accordance with said end-around carry signal and said compensation signal.

5. The apparatus of claim 4 in which
said adder is comprised of LSI arithmetic components, and
said look-ahead carry means and said further look-ahead carry means are comprised of LSI look-ahead carry chips.

6. The apparatus of claim 3 in which said look-ahead carry means comprises means responsive to said carry propagate outputs for providing group propagate outputs and said compensation means further includes AND gate means responsive to said group propagate outputs for providing said compensation signal to said carry input.

7. The apparatus of claim 6 in which
said adder is comprised of LSI arithmetic components, and
said look-ahead carry means are comprised of LSI look-ahead carry chips.

8. The apparatus of claim 6 in which said AND gate means includes input means responsive to any carry propagate output not provided to said look-ahead carry means.

* * * * *